United States Patent [19]

Schuetz

[11] Patent Number: 5,150,049
[45] Date of Patent: Sep. 22, 1992

[54] MAGNETOSTRICTIVE LINEAR DISPLACEMENT TRANSDUCER WITH TEMPERATURE COMPENSATION

[75] Inventor: John L. Schuetz, Hiawatha, Kans.

[73] Assignee: Schuetz Tool & Die, Inc., Hiawatha, Kans.

[21] Appl. No.: 719,484

[22] Filed: Jun. 24, 1991

[51] Int. Cl.⁵ .................. G01B 7/14; G01B 17/00; F01B 31/12; H04B 11/00
[52] U.S. Cl. ................. 324/207.12; 92/5 R; 324/207.13; 324/207.22; 324/207.24
[58] Field of Search ............ 324/207.12, 207.13, 324/207.22, 207.24; 333/148; 92/5 R

[56] References Cited

U.S. PATENT DOCUMENTS 3,898,555 8/1975 Tellerman ............ 324/207.13
4,952,873 8/1990 Tellerman ............ 324/207.13

FOREIGN PATENT DOCUMENTS 0043304 3/1984 Japan ............ 324/207.12
0238415 10/1988 Japan ............ 324/207.24
0216208 8/1989 Japan ............ 324/207.12

Primary Examiner—Gerard R. Strecker
Attorney, Agent, or Firm—Kokjer, Kircher, Bowman & Johnson

[57] ABSTRACT

A method and apparatus for correcting thermally induced errors in the operation of a magnetostrictive linear displacement transducer used to monitor the piston position in a hydraulic cylinder. The transducer includes a processing head on one end of the cylinder, a waveguide extending from the processing head and a permanent magnet which encircles the waveguide and travels with the piston. Temperature compensation is provided by a washer which is beveled on its outside edge and a pair of rings which are beveled to mate with the bevels on the washer. The rings have a lower coefficient of thermal expansion than the washer to effect axial shifting of the magnet when the temperature changes in order to compensate for speed change in the waveguide signals with temperature changes.

11 Claims, 2 Drawing Sheets

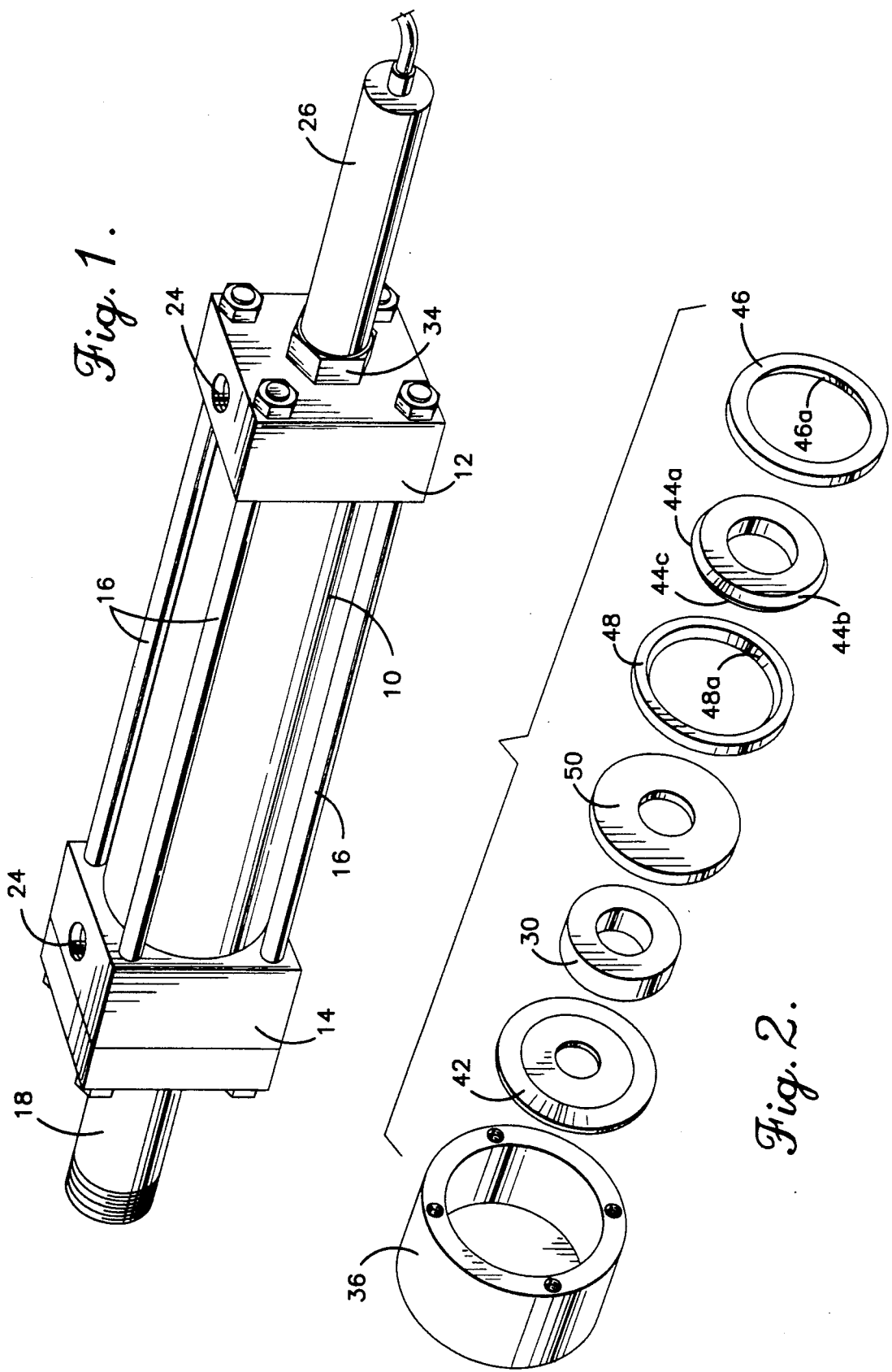

MAGNETOSTRICTIVE LINEAR DISPLACEMENT TRANSDUCER WITH TEMPERATURE COMPENSATION

FIELD OF THE INVENTION

This invention relates to the field of magnetostrictive linear displacement transducers which are used to measure and control the motion of hydraulic cylinders. More specifically, the invention is directed to a method and apparatus for correcting thermally induced errors in linear displacement transducers.

BACKGROUND OF THE INVENTION

Magnetostrictive linear displacement transducers are used in a wide variety of applications, primarily in industrial applications involving the provision of information as to the piston position in a hydraulic cylinder. The transducer indicates whether the cylinder is fully extended or fully retracted, and it also monitors the position throughout the entire stroke of the cylinder. Because of industrial needs in recent years for extremely precise linear positioning data in the control of manufacturing processes and in other applications, the magnetostrictive linear displacement transducer has become increasingly popular, primarily due to its accuracy and reliability and also its non-contact and wear-free method of measurement.

The magnetostrictive linear displacement transducer includes three principal components. These are a waveguide along which signals are propagated at ultrasonic velocity, a processing head at one end of the waveguide for analyzing the information, and a permanent magnet that travels with the piston or other device which is being monitored. The waveguide is typically a wire which is enclosed in a high pressure tube. The magnet normally takes the form of a ring having four magnets embedded in it.

The transducer operates on the basis of the Joule effect which is also known as magnetostriction. Electrical pulses are propagated down the waveguide, and the magnetic field they induce, combined with the field of the permanent magnet, creates a mechanical strain pulse on the waveguide. The strain pulse is propagated at ultrasonic velocity and is converted into an electrical signal which is received by the processing head. The processing head determines the position of the magnet based on the time required for the pulse to travel the distance between the magnet and processing head at a known velocity. Knowing where the magnet is at any time provides the location of the piston to which the magnet is connected.

The processing head analyzes the data based on the assumption that the velocity of the pulses is a known and constant value. However, the velocity of an ultrasonic signal varies with temperature changes, and treating the velocity as constant can lead to errors that can be unacceptably large if there are significant temperature fluctuations. Cylinders are often used in environments where the temperature is elevated considerably, and the ultrasonic pulses travel at a slower speed as the temperature is elevated. As a result, the transducer output can be erroneous, and the error can be unacceptably large in some applications. Conversely, if the unit is used in a cold environment, the ultrasound moves faster than it does at room temperature, and this also creates errors in the transducer output.

SUMMARY OF THE INVENTION

The present invention is directed to a method and apparatus by which thermally induced errors in a magnetostrictive linear displacement transducer are corrected. In accordance with the invention, the position of the magnet is adjusted with temperature changes by making use of the differential thermal expansion and contraction of dissimilar materials. The effects of the differential thermal expansion and contraction are mechanically amplified so that the magnet can be positionally adjusted enough to counterbalance the effect of temperature change on the signals. As a consequence, the accuracy of the transducer output is improved throughout the temperature range in which it is used, and temperature induced errors are reduced significantly.

The preferred embodiment of the invention employs a spring which urges the magnet away from the processing head. On the opposite side of the magnet, a washer and two rings are mounted adjacent to the piston. The washer has a peripheral edge which presents a crown and two beveled surfaces on opposite sides of the crown. The rings are beveled on their inside edges for engagement with the beveled surfaces of the washer and are constructed of a material having a lower coefficient of thermal expansion than the washer. As a consequence, heating causes the washer to expand to a greater extent than the rings, and the interaction between the mating beveled surfaces provides a camming effect which pushes the rings axially in order to shift the magnet toward the processing head. By properly adjusting the angles of the beveled surfaces for the amount of error each transducer/cylinder has per degree of temperature change, the positional adjustment of the magnet can be made to almost exactly offset changes in the cylinder position caused by temperature effects.

It is an important feature of the invention that compensation is made for the effects of low temperatures as well as elevated temperatures. This allows the transducer to be operated accurately both under cold conditions and under high temperature conditions.

The preferred embodiment is characterized by the use of two rings and two beveled surfaces on the washer, as this doubles the displacement axially along the waveguide. However, in many applications, only one beveled surface is required in order to obtain the axial displacement that is necessary to compensate for thermal effects. Regardless of whether one or two rings are used, the beveled surfaces translate radial expansion and contraction of the washer into axial displacement of the ring, and the axial displacement of the ring is transmitted directly to the magnet in order to adjust its position by a like amount and in the same direction as the ring is displaced.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a hydraulic cylinder equipped with a linear displacement transducer and with a temperature compensating means constructed according to a preferred embodiment of the present invention;

FIG. 2 is an exploded perspective view of the parts of the temperature compensating means that may be used with the linear displacement transducer.

DETAILED DESCRIPTION OF THE INVENTION

Figure 3:
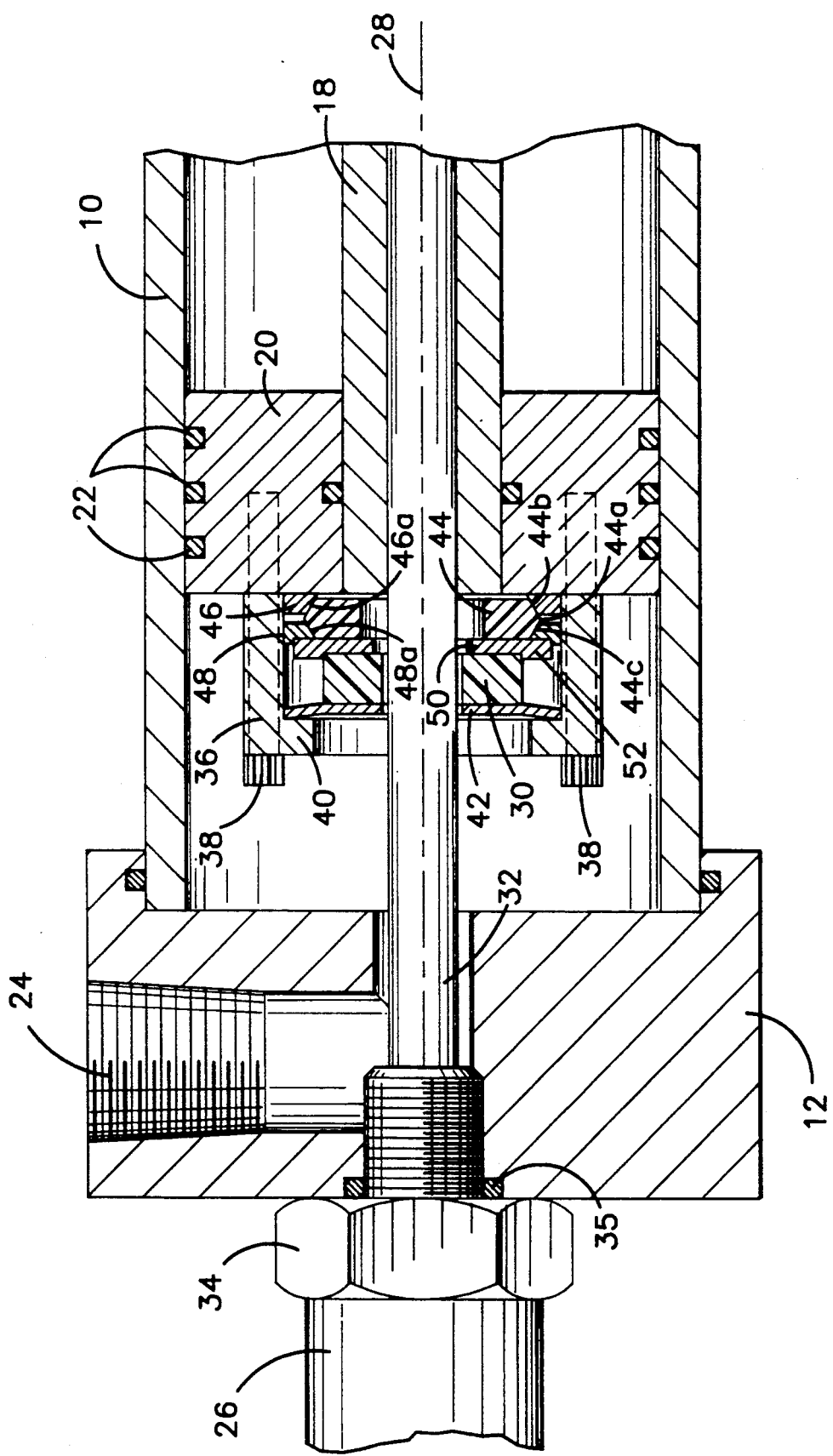
FIG. 3 is a fragmentary sectional view on an enlarged scale showing the temperature compensating means mounted to the piston which reciprocates within the hydraulic cylinder.

Referring now to the drawings in more detail and initially to FIG. 1, numeral 10 designates a hydraulic cylinder which may have a conventional construction. The cylinder 10 has a block 12 at its base end and another block 14 at its rod end. The blocks 12 and 14 are connected by threaded rods 16. Extending through the block 14 at the rod end of the cylinder is a piston rod 18. The rod 18 extends from a piston 20 (see FIG. 3) which is reciprocated within the cylinder 10 and sealed thereto by peripheral seal rings 22. Hydraulic fluid under pressure is applied to cylinder 10 on opposite sides of the piston 20 to reciprocate the piston in a conventional manner. The blocks 12 and 14 may be provided with parts 24 for accommodating the hydraulic fluid.

Continuous monitoring of the instantaneous position of the piston 20 is carried out by a magnetostrictive linear displacement transducer which includes a processing head 26, a waveguide 28 and a magnet 30. The waveguide 28 may take the form of a conductive wire housed within a high pressure tube 32 which ma be constructed of stainless steel or another suitable material. The waveguide and tube extend from the processing head 26 and through the block 12. The processing head 26 is mounted on the outer face of the block 12 and may be secured thereto by tightening a nut 34. A seal ring 35 provides a fluid tight seal between the transducer and block 12.

The magnetostrictive transducer operates in a conventional manner which is well known to those having ordinary skill in the field. Circuitry within the processing head 26 generates current pulses along the waveguide 28. The current generates a rotating electromagnetic field around the waveguide. The magnet 30 encircles the waveguide and generates its own magnetic field. The magnet 30 may have four permanent magnets embedded in it, with the axes of the magnets oriented radially to the waveguide.

In operation of the linear displacement transducer, the combined effect of the two fields induces a mechanical strain pulse on the waveguide originated at the location of the magnet 30. The strain pulse is converted into an electrical signal which is sensed by the processing head 26. By measuring the travel time of the ultrasonic pulse at a known velocity, the distance from the processing head to the magnet can be determined, thus providing information as to the instantaneous location of the piston 20. In this manner, the transducer continuously monitors the location of the piston 20 within the cylinder 10.

In accordance with the present invention, the magnet 30 is housed within a cylindrical retainer 36, along with other components which serve to compensate for the effects of temperature on the signals of the transducer. The retainer 36 is secured by a plurality of screws 38 to the face of the piston 20 which faces the processing head 26. The end of the retainer 36 opposite the piston 20 has an inwardly projecting annular lip 40 against which a spring washer 42 is engaged within the retainer 36. The washer 42 contacts magnet 30 and exerts a spring force against the magnet which continuously urges it to the right or away from the processing head 26. The spring 42 and magnet 30 both encircle the waveguide tube 32.

Temperature compensation is provided by a washer 44 and a pair of rings 46 and 48, all of which are located within the retainer 36. The washer 44 is constructed of a substance having a relatively high coefficient of thermal expansion. The rings 46 and 48 are preferably constructed of steel or another material having a relatively low coefficient of thermal expansion (preferably much less than that of the washer 44).

As shown particularly in FIGS. 2 and 3, the washer 44 has a peripheral edge which presents a crown 44a at the center and a pair of beveled surfaces 44b and 44c on opposite sides of the crown 44a. The washer 44 has flat opposite faces, and the beveled surfaces 44b and 44c angle from the crown 44a to the respective faces of the washer. The angles of the beveled surfaces 44b and 44c are the same but can differ.

Ring 46 is engaged against the piston 20 on one face. The outside edges of both rings 46 and 48 contact the inside surface of the retainer 36. The inside edge of ring 46 presents a beveled surface 46a which engages and has the same bevel angle as the washer surface 44b. The other ring 48 has an inside edge which presents a beveled surface 48a which engages and has the same bevel angle as the washer surface 44c. The two rings 46 and 48 are ordinarily spaced slightly apart from one another.

Interposed between ring 48 and the magnet 30 is a retainer plate or disk 50. The disk 50 preferably has a peripheral flange 52 which fits closely around the periphery of the magnet 30. Similarly, ring 48 has a peripheral flange which overlaps with the periphery of the retainer 50 such that all of the parts are held in place.

The components of the temperature compensating assembly are held between the lip 40 and the side of piston 20 which faces toward the processing head 26. The spring 42 holds the parts against one another due to the spring force it exerts on the magnet 30. Each component of the temperature compensating assembly has a circular periphery, and each component encircles the waveguide tube 32 and is concentric with the waveguide 28.

In operation of the cylinder 10, the magnostrictive linear displacement transducer operates in the normal fashion at room temperature to continuously monitor the position of the piston 20. The information as to the instantaneous position of the piston can be used in any desired fashion.

If the cylinder 10 is used in an environment having an elevated temperature, the waveguide 28 is heated to an elevated temperature, and the ultrasonic signals that are propagated along the waveguide travel at a velocity that decreases as the waveguide temperature increases. As the unit is heated, the washer 44 expands radially to a greater extent than the rings 46 and 48 due to the higher coefficient of thermal expansion of the washer compared to the rings. As the washer expands radially, the beveled surfaces 44b and 46a interact in camming fashion, and the other mating beveled surfaces 44c and 48a similarly interact. The camming force that results from radial expansion of washer 44 and the camming interaction between surfaces 44b and 46a displaces washer 44 to the left as viewed in FIG. 3. The similar camming interaction between surfaces 44c and 48a displaces ring 48 to the left relative to the washer 44. The displacement of ring 48 acts on the retainer disk 50 which in turns pushes the magnet 30 to the left a distance equal to the displacement of ring 48. This moves the magnet 30 closer to the processing head 26.

By properly selecting the bevel angles of the beveled surfaces that interact with one another, the magnet 30 can be displaced toward the processing head 26 by a distance that is sufficient to offset the slower velocity of the ultrasonic waves. As a result, compensation is made for the slower travel of the waves with increasing temperature, and thermally reduced errors that would otherwise be present are virtually eliminated by the positional adjustment of the magnet 30.

Temperature reduction has the opposite effect. The ultrasonic waves move faster along the waveguide 28. However, the washer 44 contracts radially to a greater extent than the rings 46 and 48, and the spring force exerted by the spring 42 in combination with the interaction between the beveled surfaces 44b and 46a causes washer 44 to shift to the right. At the same time, ring 48 shifts to the right relative to the washer due to the interaction between the beveled surfaces 44c and 48a. The spring 42 is thus able to shift magnet 40 to the right a distance sufficient to compensate for the faster velocity of the waves along the waveguide 28 with decreasing temperature.

In this manner, the temperature compensating system of the present invention automatically compensates for the changes in the speed of the signals and for other thermally induced effects resulting from either reduced or elevated temperatures. In either case, the position of the magnet 30 is automatically adjusted axially along the waveguide 28 in a direction and by a distance that compensates for the changed velocity of the signals.

It is noted that the beveled surfaces that interact with one another translate radial expansion of the washer 44 into axial displacement of the ring 48 (which is directly translated into like axial displacement of the magnet 30). The bevel angles can be selected to result in the desired axial displacement of ring 48 resulting from a given relative radial expansion or contraction of the washer 44. With a relatively small bevel angle of the mating surfaces, a relatively small radial expansion or contraction is translated into a relatively large axial displacement of the ring 48. Conversely, if the bevel angle is steep, ring 48 is displaced axially only a short distance with a given radial expansion or contraction of the washer 44. By properly selecting the bevel angles, the axial displacement of ring 48 can be made to almost exactly compensate for the thermal effects in the temperature range contemplated for operation of the cylinder 10.

Although two rings 46 and 48 are disclosed, it is entirely possible in some applications to make use of only one ring. The provision of two rings amplifies the axial displacement resulting from a given radial expansion or contraction. Assuming that all bevel angles are the same, the presence of the ring 46 causes washer 44 to shift axially by the same distance as the ring 48 is shifted axially by the washer. Consequently, the second ring effectively doubles the axial displacement of ring 48 resulting from a given radial expansion or contraction of washer 44. This amplification effect is required in some applications in order to displace the magnet far enough axially to compensate for the thermal effects. In other applications, only one ring is necessary. It is again pointed out that the bevel angles can be adjusted to vary the axial displacement, and the number of rings can also be varied in order to vary the axial displacement.

It should also be noted that more than one ring and washer assembly can be arranged in series in order to still further amplify the axial displacement. A suitable combination of the number of rings and washers and the bevel angles can be selected for a particular application, depending upon the displacement that is required to compensate for the thermal effects that are expected to be encountered in the intended application of the cylinder.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention I claim:

1. In a magnetostrictive linear displacement transducer having an elongated waveguide along which ultrasonic signals are transmitted to measure the position of a magnet which travels along the waveguide with a piston, a temperature compensating system comprising:

a housing secured to the piston and containing the magnet;

spring means in said housing for urging said magnet in one direction along the axis of the waveguide; and first and second members having different coefficients of thermal expansion and supported in said housing to interact in camming fashion such that said first member is moved by camming action in a direction opposite said one direction along the axis of the waveguide against the force of said spring means in response to increasing temperature, said magnet being moved with said first member to change the magnet position in a direction and by a distance effective to substantially compensate for changes in the speed of the ultrasonic signals caused by changing temperature.

2. The temperature compensating system of claim 1, wherein:

said second member comprises a washer constructed of a first material and encircling the waveguide within said housing, said washer having an outer edge presenting a beveled surface thereon; and said first member comprises a ring having an inside edge presenting a beveled surface engaging the beveled surface of the second member, said ring having a lower coefficient of thermal expansion than said first material whereby the differential in the coefficients of thermal expansion effects camming interaction between the beveled surfaces to displace said ring in said opposite direction in response to increasing temperature and in said one direction under the influence of said spring means in response to decreasing temperature.

3. The temperature compensating system of claim 2, including a rigid retainer plate between said magnet and ring for translating axial movement of said magnet.

4. The temperature compensating system of claim 2, including:

a crown on said outer edge of the washer from which said beveled surface on said outer edge extends;

a second beveled surface on said outer edge of the washer extending from the crown in a direction opposite the first mentioned beveled surface; and a second ring held stationary in the housing and constructed of a material having a lower coefficient of thermal expansion than said first material, said second ring presenting a beveled inside edge acting against said second beveled surface to increase the displacement of the first mentioned ring in response to temperature changes.

5. In combination with a magnetostrictive linear displacement transducer having an elongated waveguide along which ultrasonic signals are transmitted, a piston movable along the waveguide axis and a magnet movable with the piston and affecting said ultrasonic signals in a manner to provide an indication of the piston location:

a retainer structure mounted to the piston for movement therewith, said magnet being housed in said retainer structure;

a spring in said retainer structure acting to urge the magnet in one direction along the waveguide axis;

a washer in said retainer structure constructed of a first material and encircling the waveguide axis, said washer having an outer edge presenting a beveled surface;

a ring in said retainer structure constructed of a second material having a lower coefficient of thermal expansion than said first material, said ring presenting a beveled inside edge surface acting against said beveled surface of the washer to effect movement of the ring in a direction along the waveguide axis opposite said one direction in response to increasing temperature by reason of the differential in the coefficients of thermal expansion between said first and second materials; and means for arranging said washer and ring to effect movement of said magnet along the waveguide axis with said ring to substantially compensate for changes in the speed of the ultrasonic signals caused by changing temperature.

6. The combination of claim 5, including:

a crown on said outer edge of the washer from which said beveled surface on said outer edge extends;

a second beveled surface on said outer edge of the washer extending from the crown in a direction opposite the first mentioned beveled surface; and a second ring held stationary in the retainer structure and constructed of a material having a lower coefficient of thermal expansion than said first material, said second ring presenting a beveled inside edge acting against said second beveled surface to increase the displacement of the first mentioned ring in response to temperature changes.

7. In a power cylinder having a reciprocating piston and a magnetostrictive linear displacement transducer which includes an elongated waveguide along which the piston moves, a processing head adjacent one end of the cylinder for applying electrical signals to the waveguide, and a magnet movable with the piston and generating a magnetic field which interacts with the electrical signals to produce ultrasonic signals which are propagated along the waveguide to the processing head to provide information indicative of the piston location, the improvement comprising:

a retainer structure mounted to the piston and housing the magnet;

spring means in said retainer structure exerting a spring force urging the magnet along the waveguide axis in a direction away from the processing head;

a washer constructed of a first material and encircling the waveguide within said retainer structure, said washer having opposite faces and an outer edge surface presenting a crown and a pair of beveled surfaces angling from said crown toward the respective faces of the washer;

a pair of rings in said retainer structure having beveled inside edge surfaces engaged against the respective beveled surfaces of said washer, each ring being constructed of a material having a lower coefficient of thermal expansion than said first material;

one of said rings being stationary and the other ring moving axially along the waveguide in response to temperature changes effecting camming interaction between the beveled surfaces of the washer and rings by reason of the differential in the coefficients of thermal expansion between the different materials; and means for translating axial movement of said other ring into axial movement of said magnet effective to substantially compensate for changes in the speed of the ultrasonic signals caused by changing temperatures.

8. The improvement of claim 7, including a retainer plate between said magnet and other ring for translating axial movement of said other ring into corresponding axial movement of the magnet.

9. In a magnetostrictive linear displacement transducer having an elongated waveguide, a processing head for applying electrical signals to the waveguide, and a magnet which moves with a piston and which produces a magnetic field with which the electrical signals interact to produce ultrasonic signals propagated along the waveguide to the processing head to provide information indicative of the piston location, a method of compensating for the effects of temperature on the speed of the ultrasonic signals comprising moving the magnet toward the processing head with increasing temperature by a distance sufficient to substantially counteract the slower speed of the ultrasonic signals with increasing temperature.

10. The method of claim 9, wherein said step of moving the magnet comprises using the differential between the coefficients of thermal expansion of two dissimilar materials to effect movement of the magnet.

11. The method of claim 10, wherein said step of using the differential comprises placing mating beveled surfaces of the dissimilar materials together in a manner to effect camming displacement of one material axially along the waveguide with changing temperature and translating the axial displacement of said one material into axial displacement of the magnet.

* * * * *